3,327,213
ELECTRICAL CALORIMETER FOR MEASURING THE MEAN SQUARE OF A VARYING VOLTAGE
Walter A. Von Wald, Jr., Hillcrest Heights, and Jacob E. Dinger, Silver Hill, Md., assignors to the United States of America as represented by the Secretary of the Navy
Filed Aug. 8, 1963, Ser. No. 300,948
1 Claim. (Cl. 324—106)

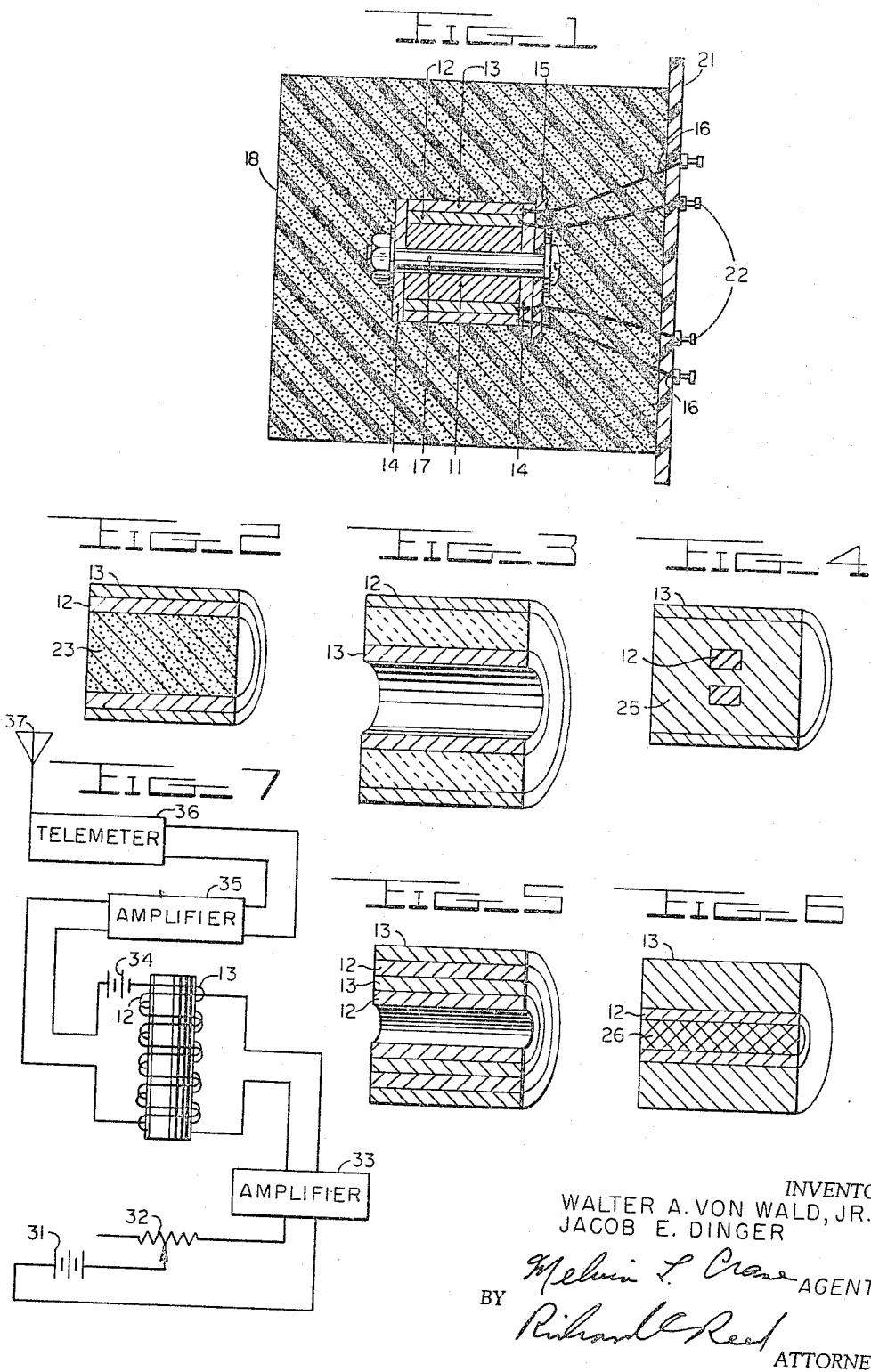

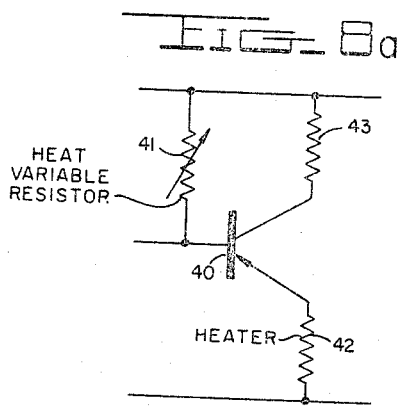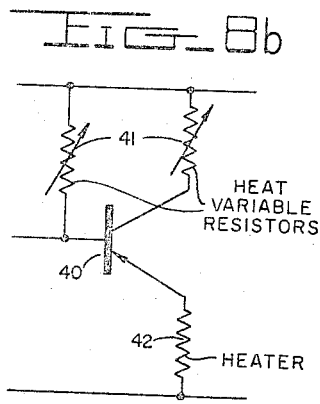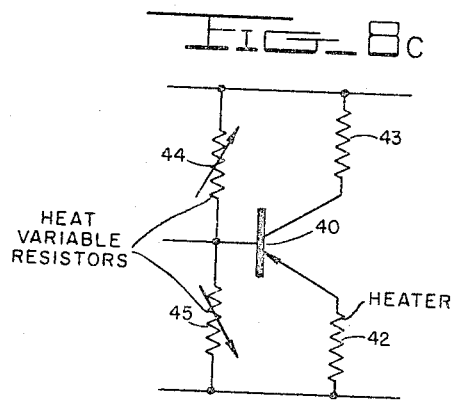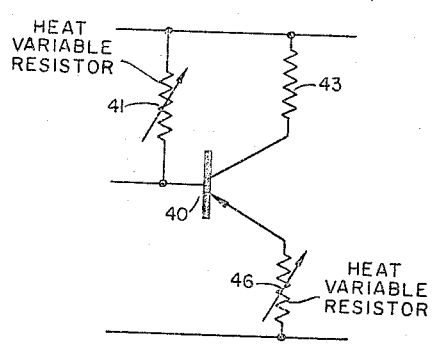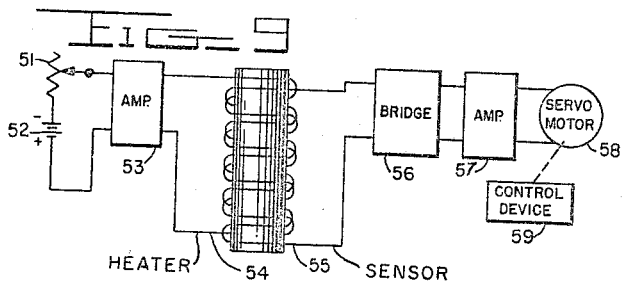

The invention described herein may be manufactured and used by or for the Government of the United States of America for governmental purposes without the payment of any royalties thereon or therefor.

The present invention is directed to an electrical calorimeter system for measuring the total energy dissipated by a varying electric current through a given load circuit over an interval of time and more particularly to a system for measuring the mean square of a varying voltage.

Heretofore recording and telemetering equipment has been used in rockets, satellites, etc., to record or to telemeter back rapidly changing values of a large number of variables. There are applications in the recording and telemetry art that involve leisurely, and somewhat random, processes of nature. In such cases, one desires to record or to telemeter an average value of a variable under consideration. Examples of such cases include an average of the varying height of ocean waves, average windspeed, or an electrical output. The calorimeter can serve as a means for conversion of other variables to a convenient data form for recording or telemetering.

It is therefore an object of the present invention to provide a simple, relatively inexpensive, long lasting system for obtaining an averaged mean-square voltage.

Another object is to provide a system for remote automatic operation.

Still another object is to remotely determine average values of a variable condition over a desired interval of time.

Yet another object is to measure random, slowly varying phonomena and converting the data to a convenient form for recording or telemetry.

Other and more specific objects of this invention will become apparent upon a careful consideration of the following detailed description when taken together with the accompanying drawing, in which:

FIG. 1 is a cross sectional view of a device for carrying out the invention;

FIGS. 2–6 illustrate different modifications of the core used in the device;

FIG. 7 illustrates an electrical circuit suitable for operation of the device;

FIGS. 8a, b, c, and d are different arrangements making use of a transistor in different electrical circuits, and FIG. 9 illustrates a calorimeter used as a part of a control system.

The present invention makes use of an electrical calorimeter to average the square of the output signal from a source that may have variable outputs. The device may include a high heat conductivity material such as a copper sleeve or coil form about which is wound a heater coil and a coil of temperature sensing wire, or a thermistor inserted into the core or any other temperature sensing arrangement having good heat transfer with the copper sleeve. A highly insulating material of low thermal conductivity such as a foam plastic insulation surrounds the heater and temperature element to prevent rapid loss of heat from the copper sleeve. A signal or source of current is fed through the heater element which heats the copper sleeve in accordance with the square of the current flow. The temperature sensing wire then passes, modulates, or changes the magnitude of the current or voltage in the temperature sensing circuit to give a signal that can be indicated by a meter, a suitable recorder or telemetered to a remote location in accordance to the sensed temperature. The copper slug heats up gradually over an interval of time and by a measurement of the temperature change of the slug over this interval of time, the total energy associated with the variable being observed is measured. The electrical calorimeter of the present invention can be used in two ways, intermittently or continuously. When operated intermittently, it integrates the input power over an interval of time that is essentially limited by the thermal time constant of the device. When operated continuously, the device averages the input power over an interval of the time that is mathematically related to its thermal time constant.

When used in conjunction with associated equipment, components or systems, the device can operate indicators, carry out control functions, and modulate telemetry equipment. By the use of a plurality of heater coils and temperature sensing wires wound either simultaneously into a single coil or wound separately with the temperature sensing coils surrounding the heater coils, the device can perform analogue mathematical operations such as addition, substraction and multiplication of integrated or averaged variables. If active circuits are used in conjunction with the calorimeter, it is possible that other diverse mathematical operations can be performed in analogue form.

Now referring to the drawings, there is shown by illustration in FIG. 1, a cross-sectional view of a typical electrical calorimeter for carrying out the functions of this invention. As shown, the device includes a coil form as a copper sleeve 11, a heater winding coil 12 surrounds the copper coil and a temperature sensing element 13 having a high temperature coefficient. The copper sleeve, heating coil, and temperature sensing element are assembled with an insulating washer 14 at each end with a plastic washer 15 held together by a suitable bolt 17 that passes through the copper sleeve and the washers.

The calorimeter unit is enclosed in an insulating enclosure 18 of high insulating material such as foam plastic. The foam plastic enclosure fits into any suitable container not shown for simplification of the drawings and is provided with a plastic mounting plate 21 which secures the insulated enclosed device in the container. The mounting plate is also provided with sufficient electrical terminals 22 to supply a current to the heater windings and to connect with the temperature sensing windings for the output signals through wire terminals extending from their respective coils. The heater element and temperature sensing elements are shown connected in an electrical circuit in FIG. 7.

FIGS. 2–6 are modifications of the electrical calorimeter shown by illustration in FIG. 1, and in use are provided with suitable electrical connections and an insulated enclosure such as shown in FIGS. 1 and 7.

FIG. 2 illustrates a temperature sensor surrounding a heater coil that surrounds a low conductivity coil form 23.

FIG. 3 illustrates a core having the heater on the outer surface spaced from the temperature sensor and separated therefrom by thermal insulation 24. A low conductivity coil form is included within the temperature sensor.

FIG. 4 has a temperature sensor surrounding a high conductivity coil form 25 which includes at the center thereof a heater element or coil.

FIG. 5 illustrates a unit having two heater coil windings and two temperature sensing coil windings.

FIG. 6 illustrates a unit which includes a temperature sensor element surrounding a heater unit that includes a coil-heater 26.

The heat capacity of the above described calorimeter cores involves the mass and specific heat of the coil form, the heater, the resistance-thermometer windings and the insulating material. The effective heat capacity at any given time involves the thermal conductivities of the materials and the specific physical configuration of the unit as well as the masses and specific heats of the materials. The ideal calorimeter is insulated from its surroundings by perfect insulation but this is not to be found. Therefore a certain amount of limitation is placed on the integrating accuracy of an electrical calorimeter over indefinite periods of time. However this does not place any significant limitation on its capability for accurately integrating or averaging of input power over limited periods of time.

FIG. 7 illustrates an electrical circuit suitable for operation of the device for telemetry. As shown the circuit includes a battery 31 or an electrical power source connected to one side of the heater coil or element 12 through the amplifier 33 and to a variable resistor 32. An output current through the variable resistor 32 is amplified by amplifier 33 and fed to the heater coil or element 12. The temperature sensor coil 13 surrounds the heater coil and is connected to an electrical source 34, and an amplifier 35 which amplifies the output of the temperature sensor and feeds the amplified signal to a telemetering circuit 36 that sends out a corresponding signal through the antenna 37 to a receiver not shown for simplification of the drawings. The device can be used for example to telemeter average wind velocity, ocean wave information, and the output of a power source.

In operation, the parameter to be measured causes a current flow through use of a power source and a variable resistor or a direct feed from a power source to the heater element. The heater produces heat in accordance to the current flow through the element. As the heater produces heat the temperature of the calorimeter core gradually increases. During the time that the heater is heating the calorimeter core, the temperature sensitive sensor changes resistance according to the heat change thereby permitting a current flow which is telemetered by the telemetering equipment to which the temperature sensitive sensor is connected. The calorimeter may be used in conjunction with some sort of a servomechanism as an indicating device to indicate the output. The calorimeter response is a linear function of input power for integrating times equal to or less than the time constant. Thus the energy of the input is determined by the change in the temperature of the core. The use of thermal insulation between the heater coil 12 and the temperature sensor 13 of FIG. 3 can be used to design in time lags that might be useful in some desired applications.

FIGS. 8a, b, c and d illustrate different calorimeter circuits using an active element such as a transistor 40.

FIG. 8a illustrates a circuit including the transistor 40 with a temperature sensor 41 connected between the base and one side of the line, a heater winding 42 connected between the emitter and the other line and a resistor 43 connected between the collector and the line to which the temperature sensor is connected.

FIG. 8b illustrates a circuit which includes two temperature sensors 41, one each connected between the base and the collector of a transistor and one line of a circuit and a heater 42 connected between the emitter of the transistor and the other line.

FIG. 8c illustrates a circuit including a transistor 40 with positive and negative coefficient temperature sensors 44 and 45 respectively, connected to the base opposing each other. A heater 42 is connected to the emitter of the transistor and to the opposite side of the negative temperature sensor, and a resistor 43 is connected to the collector of the transistor and to the opposite side of the negative temperature sensor.

FIG. 8d represents a calorimeter circuit having a transistor 40 with a temperature sensor 41 connected with the base, a variable resistance heater 46 connected with the emitter and a resistor 43 connected with the collector. The opposite ends of the temperature sensor and the resistor connects to the same line in the circuit.

Such systems as described above can be used for carrying out the features of the invention as described previously for the amplifier circuitry type calorimeter. Also, such circuits making use of vacuum tubes will be obvious to one skilled in the art.

FIG. 9 illustrates the use of a calorimeter in a control circuit. The circuit includes a sensor 51 and a power source 52 which is connected with the amplifier 53 which amplifies a signal from the sensor and feeds the amplified signal to a heater winding 54. A temperature sensor 55 senses the temperature change and is connected with an electrical bridge 56. The electrical bridge connects with amplifier 57 that amplifies the signal from the temperature sensor and feeds the amplified signal to a servo-motor 58. The servo-motor then controls the control device 59. Thus the device can be used as a control device.

FIGS. 7 and 9 set forth examples of operable systems having been shown with one side of the sensor element connected directly to the calorimeter and making use of an amplifier to amplify the output signal. These are not essential to the invention since any suitable means can be used to indicate, record or telemeter the output signal.

An article disclosing the use of an electrical calorimeter as equipment for telemetering ocean wave information is published in the Marine Sciences Instrumentation, vol. 2, pages 107–111 published by Plenum Press, Inc., 227 West 17th Street, New York (1963). Equipment for Telemetering Ocean-Wave information by W. A. Von Wald, Jr.

Obviously many modifications and variations of the present invention are possible in the light of the above teachings. It is therefore to be understood that within the scope of the appended claim the invention may be practiced otherwise than as specifically described.

What is claimed is:

An electrical calorimeter for determining a direct measurement of the average of the mean square of an input signal which comprises:
- a heat sensitive element that changes temperature according to surrounding temperature,
- at least one electrical heater means surrounding and adjoining said heat sensitive element and adjacent thereto for changing the temperature of said heat sensitive element due to an electrical input signal through said heater means,
- at least one resistance change heat sensor means, surrounding and adjoining said heater means and adjacent thereto for determining a temperature change in said heat sensitive element,
- an enclosure of heat insulating material enclosing said heat sensitive element, said electrical heater means, and said resistance change heat sensor means, and
- means electrically connected with said heat sensor means for indicating any change in temperature of said heat sensitive element.

References Cited
UNITED STATES PATENTS

| | | | |
|---|---|---|---|
| 2,645,756 | 7/1953 | Goodwin | 324—106 X |
| 2,984,729 | 5/1961 | Hykes et al. | 219—20 |
| 2,995,708 | 8/1961 | Hudson et al. | 324—95 X |

WALTER L. CARLSON, *Primary Examiner.*

G. L. LETT, J. J. MULROONEY, *Assistant Examiners.*